United States Patent [19]

Yokoyama

[11] Patent Number: 5,136,699
[45] Date of Patent: Aug. 4, 1992

[54] LOGICAL ADDRESS GENERATING DEVICE FOR AN INSTRUCTION SPECIFYING TWO WORDS, EACH DIVIDED INTO TWO PARTS

[75] Inventor: Yasushi Yokoyama, Tokyo, Japan
[73] Assignee: NEC Corporation, Tokyo, Japan
[21] Appl. No.: 412,517
[22] Filed: Sep. 26, 1989

[30] Foreign Application Priority Data

Sep. 26, 1988 [JP] Japan ............................ 63-238861

[51] Int. Cl.$^5$ ............................ G06F 9/26; G06F 9/00
[52] U.S. Cl. .................................... 395/400; 395/425
[58] Field of Search ... 364/200 MS File, 900 MS File; 395/400

[56] References Cited

U.S. PATENT DOCUMENTS

| | | | |
|---|---|---|---|
| 3,938,096 | 2/1976 | Brown et al. | 364/200 |
| 3,949,378 | 4/1976 | Crabb et al. | 364/200 |
| 3,976,978 | 8/1976 | Patterson et al. | 364/200 |
| 4,206,503 | 6/1980 | Woods et al. | 364/200 |
| 4,240,139 | 12/1980 | Fukuda et al. | 364/200 |
| 4,361,868 | 11/1982 | Kaplinsky | 364/200 |
| 4,385,352 | 5/1983 | Bienvenu | 364/200 |

Primary Examiner—Joseph A. Popek
Assistant Examiner—Michael A. Whitfield
Attorney, Agent, or Firm—Foley & Lardner

[57] ABSTRACT

On generating a logical address from first through third words where the third word has a predetermined word length and the first and the second words are longer, a lower sum is calculated together with a carry by using the third word and first and second lower parts which are selected from the first and the second words to have predetermined word length. The carry is either a binary zero or a binary one bit. Necessity or lack of necessity for addition of first and second higher parts and the carry is decided by using the second higher part and the carry. When the addition is unnecessary, the first higher part and the lower sum are concatenated into the logical address. If the addition is necessary, a higher sum of the first and second higher parts and the carry is calculated and concentrated with the lower sum into the logical address. The addition is unnecessary either when the second higher part consists of binary zero bits and the carry is the binary zero bit or when the second highest part consists of binary one bits and the carry is the binary one bit.

4 Claims, 2 Drawing Sheets

LOGICAL ADDRESS GENERATING DEVICE FOR AN INSTRUCTION SPECIFYING TWO WORDS, EACH DIVIDED INTO TWO PARTS

BACKGROUND OF THE INVENTION

This invention relates to a device for generating a logical address in response to an instruction word or instruction which specifies first through third words.

In the manner known in the art of electronic digital computers, a logical address is generated from an instruction word. An electronic digital computer comprises an executing unit, such as an arithmetic unit, a plurality of base registers, and a plurality of index registers. The instruction word comprises an operation code field, a base register field, an index register field, and an offset field. The operation code field indicates an operation which should be carried out by the executing unit. The base register field specifies one of the base registers that indicates a first word for use in generating a logical address. The index register field specifies one of the index registers that indicates a second word for use in generating the logical address. The offset field indicates an offset for use in generating the logical address. In relation to the first and the second words, the offset is herein called a third word. It is therefore possible to understand that an instruction word specifies the first through the third words.

Conventionally, each of the first through the third words has a predetermined word length which may be called a single word length. On the other hand, it is a recent trend to widen a memory space of the computer in order to cope with a much increased amount of data which the computer should process. The memory space is widened by typically using the first and the second words, each having either a double word length or a longer word length. In this event, a conventional logical address generating device must comprise an adder and a carry look ahead, each for the double or the longer word length. In other words, the conventional logical address generating device must have an increased amount of hardware. In addition, it takes twice as long a time according to a simple-minded estimation to generate the logical address when the first and the second words are of the double word length. The time may be shortened by using a high-speed carry look ahead. Even with the high-speed carry look ahead, it is very difficult to generate the logical address in one machine cycle.

SUMMARY OF THE INVENTION

It is therefore an object of the present invention to provide a device for generating a logical address in response to an instruction word specifying three words, two of which have a long word length, such as a double word length, and which need the slightest possible increase of hardware.

It is another object of this invention to provide a logical address generating device of the type described, which can generate the logical address in one machine cycle in most cases and needs only two machine cycles in few cases when two of the three words have a double word length.

Other objects of this invention will become clear as the description proceeds.

According to this invention, there is provided a device for generating a logical address from an instruction word supplied thereto and specifying first, second, and third words, where the third word has a predetermined word length and where each of the first and the second words is longer than this word length, and which comprises: (a) first selecting means supplied with the first word for selecting one of a first higher and a first lower part of the first word, the first lower part having the predetermined word length; (b) second selecting means supplied with the second word for selecting one of a second higher and a second lower part of the second word, the second lower part having the predetermined word length; (c) an adder connected to the first and the second selecting means and supplied with the third word for adding the first and the second lower parts and the third word to produce a carry and a lower sum having the predetermined word length; (d) holding means connected to the adder for holding the carry; (e) decision means connected to the holding means and supplied with the second higher part for deciding the necessity or lack or necessity for addition of the first and the second higher parts and the carry for generating the logical address to produce a result signal indicative of whether or not the addition is necessary; and (f) output means connected to the adder and the decision means and supplied with the first higher part for producing the logical address by concatenating the first higher part and the lower sum as a higher and a lower address part of the logical address.

DESCRIPTION OF THE PREFERRED EMBODIMENT

Figure 1:
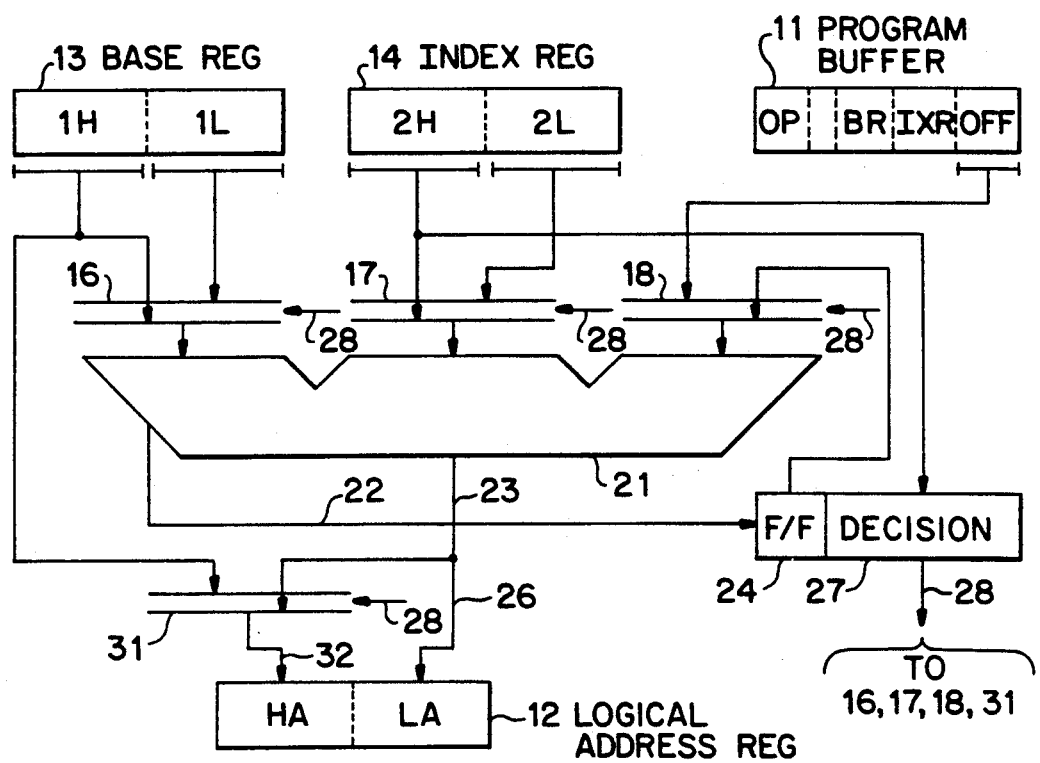
FIG. 1 shows a block diagram of a logical address generating device according to an embodiment of the instant invention together with a program buffer, base and index registers, and a logical address register.

Referring to FIG. 1, a logical address generating device is shown for use according to a preferred embodiment of the present invention in generating a logical address in cooperation with base and index registers, a program buffer 11, and a logical address register 12. An instruction word or instruction is buffered in the program buffer 11 and has an operation code field, a base register field, an index register field, and an offset field which are indicated at OP, BR, IXR, and OFF. The offset field specifies an offset which is for use in generating the logical address. The offset has a predetermined word length, which is herein called a single word length and is typically thirty-two bits long.

In the manner known in the art, the base and the index register fields of the instruction word are for specifying one of the base registers as a selected base register 13 and one of the index registers as a selected index register 14. The selected base and index registers 13 and 14 are indicative of first and second words, respectively, which are for use in generating the logical address. In relation to the first and the second words, the offset field is herein said to specify a third word of a single word length. It is therefore possible to understand that the instruction word specifies the first through the third words and that the device is for generating the logical address in response to the instruction word.

In FIG. 1, it will be assumed that each of the first and the second words has a double word length which is twice as long as the single word length. Each of the base registers and consequently the selected base register 13 is capable of separately producing first higher and lower halves 1H and 1L of the first word. Similarly, the selected index register 14 is capable of separately producing second higher and lower halves 2H and 2L of the second word.

From the base register 13, a first selector 16 is supplied with the first word to select one of the first higher and lower halves 1H and 1L in a manner which will presently be described. From the index register 14, a second selector 17 is supplied with the second word to select one of the second higher and lower halves 2H and 2L. From the program buffer 11, a third selector 18 is supplied with the third word of the offset field of the instruction word under consideration.

A three-input adder 21 for three single-word-length words is connected to the first through the third selectors 16 to 18 and supplied with the first and the second lower halves 1L and 2L and the third word at first. Inasmuch as the adder is for the single word length, the adder 21 delivers a carry of one binary bit to a carry connection 22 and supplies an overall output connection 23 with a lower sum having the single word length. The carry is either a binary one bit or a binary zero bit and is stored in a flip-flop 24. The lower sum is delivered to the logical address register 12 as a lower address part LA of the logical address through the overall output connection 23 and thence to a first output connection 26.

A decision unit 27 is connected to the flip-flop 24 and supplied with the second higher half 2H from the index register 14. In the manner which will later be described more in detail, the decision unit 27 decides the necessity or lack of necessity for addition of the first and the second higher halves 1H and 2H and the carry for generating the logical address. The decision unit 27 thereby supplies an overall control connection 28 with a result signal indicative of the result of that decision, that is, whether or not the addition is necessary. Before the addition is decided to be either necessary or unnecessary, namely, before production of the result signal, the decision unit 27 delivers a selection signal to the overall control connection 28.

The first through the third selectors 16 to 18 are supplied from the decision unit 27 through the overall control connection 28 with the selection signal at first. The third selector 18 is connected to the flip-flop 24 and the overall control connection 28 and selects the third word in response to the selection signal. It is now understood that the adder 21 is supplied with the first and the second lower halves and the third word when the first through the third selectors 16 to 18 are supplied with the selection signal through the overall control connection 28.

An output selector 31 is connected to the adder 21 through a branch of the overall output connection 23 and is supplied from the base register 13 with the first higher half 1H. The output selector 31 is connected furthermore to the decision unit 27 throgh the overall control connection 28. When the result signal indicates that the addition is unnecessary, the output selector 31 delivers the first higher half 1H as a higher address part HA of the logical address to the logical address register 12 through a second output connection 32. It is now understood in this event that the output selector 31 serves as an output unit which is connected to the adder 21 and the decision unit 27 and supplied with the first higher half 1H for producing the logical address by concatenating the first higher half 1H and the lower sum in the address register 12.

In most cases, the addition is unnecessary. The logical address generating device can therefore generate the logical address in one machine cycle. The adder 21 is for the single word length. The flip-flop 24 serves as a carry holding unit and can be a one-bit memory. The carry is used only in deciding whether or not the addition is necessary. The logical address generating device therefore needs only a slight increase of hardware when compared with a logical address generating device for the first through the third words which have the single word length in common.

It may be that the addition becomes necessary in some cases. In this event, the result signal indicates that the addition is necessary.

Under the circumstances, the first through the third selectors 16 to 18 supply the adder 21 with the first and the second higher halves 1H and 2H and the carry. In response, the adder 21 adds the first and the second higher halves 1H and 2H and the carry to produce a higher sum. Controlled by the result signal under consideration, the output selector 31 delivers the higher sum to the second output connection 32. The lower sum is used as the lower address part LA as before.

It is now possible to understand that an output unit comprises the output selecting unit which is connected to the adder 21 and the decision unit 27 and supplied with the first higher half 1H for selecting the first higher half 1H as the higher address part HA when the result signal indicates that the addition is unnecessary. The output selecting unit selects the higher sum as the higher address part HA when the result signal indicates that the addition is necessary. In the output unit, a combination of the first and the second output connections 26 and 32 serves as a concatenating unit for concatenating the higher and the lower address parts HA and LA into the logical address. In either event, the logical address is stored in the logical address register 12.

Figure 2:
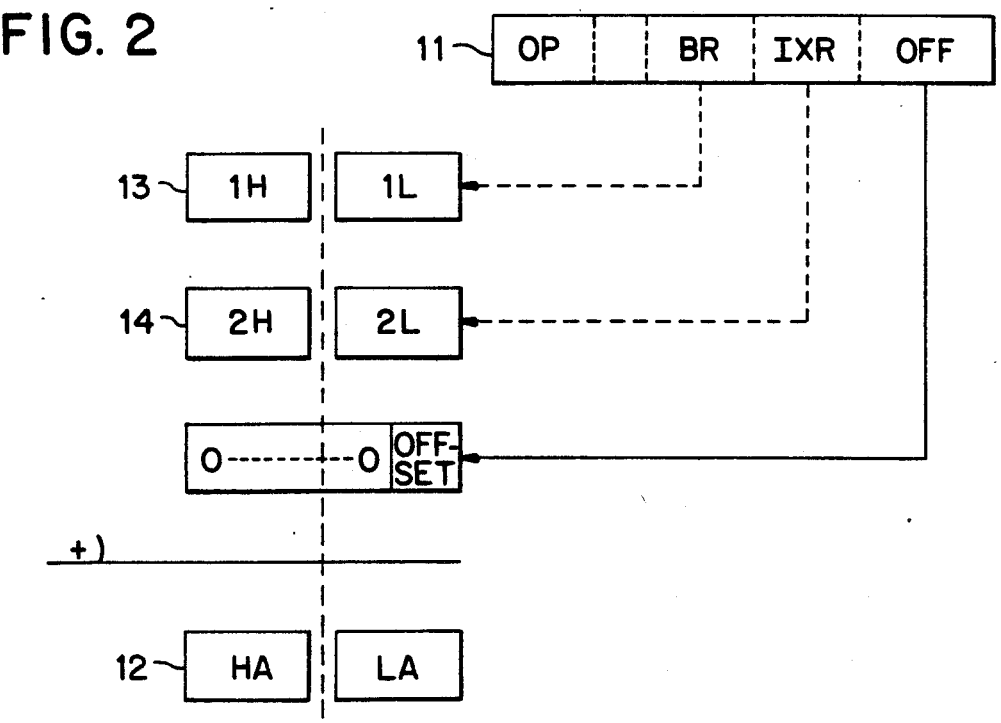
FIG. 2 is a representation which is for use in describing the operation of the logical address generating device illustrated in FIG. 1.
Figure 3:
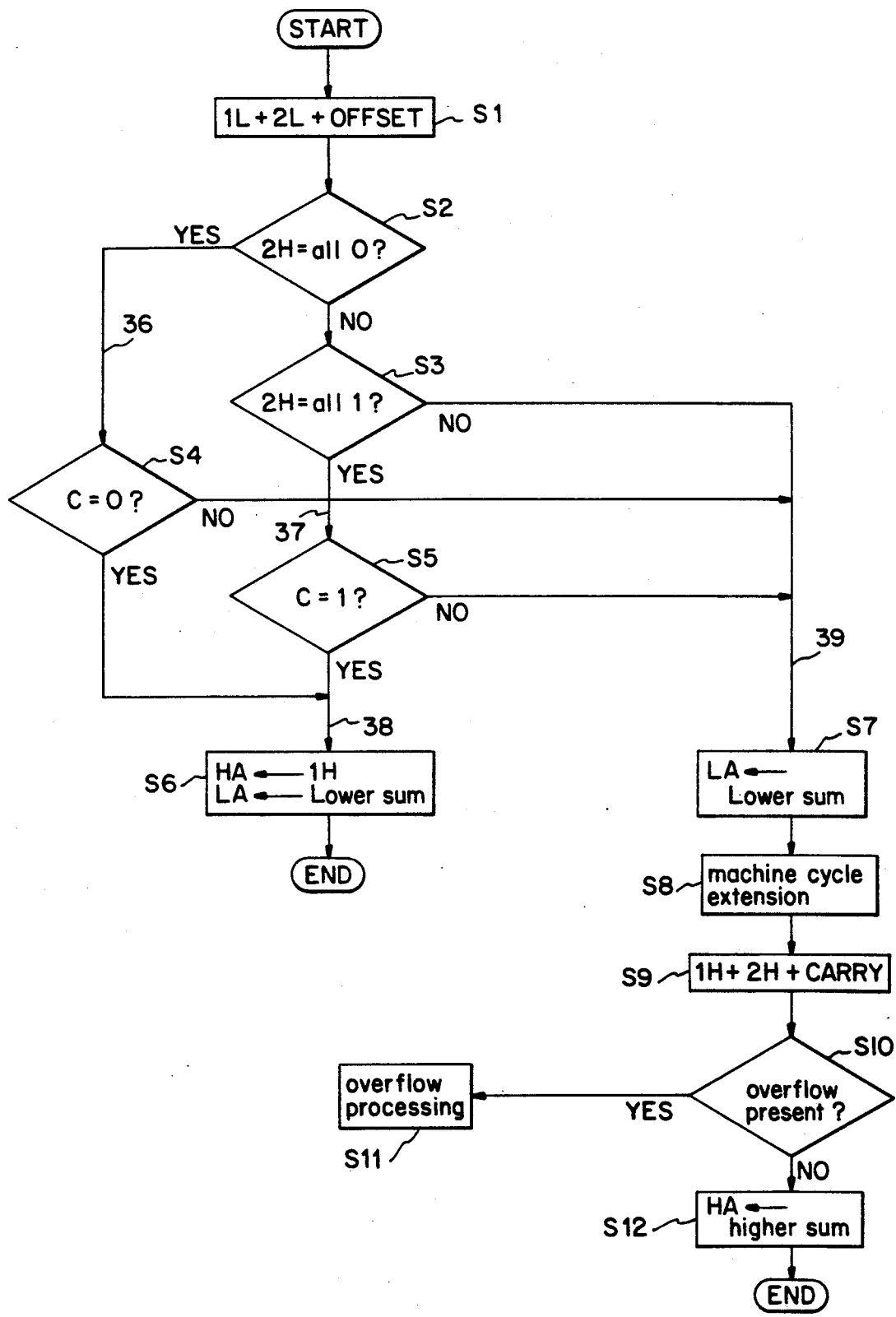
FIG. 3 shows a flow chart for use in describing the operation of the logical address generating device depicted in FIG. 1.

Referring to FIGS. 2 and 3 in addition to FIG. 1, operation of the logical address generating device will be described in a little more detail. In FIG. 2, a part of the program buffer 11 is depicted. The logical address register 12 and the base and the index registers 13 and 14 are illustrated with the first higher and lower halves 1H and 1L, the second higher and lower halves 2H and 2L, and the higher and the lower address parts HA and LA divided by a vertical dashed line.

Two dashed lines, each with an arrow, show that the base and the index registers 13 and 14 are selected by the base and the index register fields BR and IXR of the instruction word to which attention is directed. In practice, the offset field OFF specifies an offset which consists of effective binary bits having a shorter word length than the single word length. The offset is therefore depicted with the least significant bit aligned with the least significant bits of the first and the second words and with its higher bits filled with binary zero bits. As described above, such an offset is used as the third word for calculating the lower sum.

In FIG. 3, generation of the logical address starts when the instruction word should be processed. The decision unit 27 is activated to produce the selection signal. The adder 21 calculates the lower sum at a first step S1.

During progress of calculation of the lower sum, the second higher half 2H is delivered to the decision unit 27, which checks at a second step S2 whether or not the second higher half 2H consists of binary zero bits. If not, the decision unit 27 checks at a third step S3 whether or not the second higher half 2H consists of binary one bits. It is now understood that the decision unit 27 comprises a first decision circuit (S2, S3) supplied with the second higher half 2H for checking whether the second higher half 2H consists of either binary zero bits or binary one bits. The first decision circuit thereby produces first and second part decision signals when the second higher half 2H consists of binary zero and the binary one bits, respectively.

In the meantime, the carry is stored in the flip-flop 24. The carry will be denoted by C. If the second higher half 2H is decided at the second step S2 to consist of binary zero bits, the decision unit 27 checks at a fourth step S4 whether or not the carry is a binary zero bit. If the carry is a binary zero bit, the decision unit 27 produces a result signal to indicate that addition in unnecessary. If the second higher half 2H is decided at the third step S3 to consist of binary one bits, the decision unit 27 checks at a fifth step S5 whether or not the carry is a binary one bit. In the affirmative case, the decision unit 27 produces a result signal to indicate that addition is unnecessary.

When the result signal indicates that addition is unnecessary, the output selector 31 selects, at a sixth step S6, the first higher half 1H, which is stored in the logical address register 12 as the higher address part HA with the lower sum stored as the lower address part LA. Under those circumstances, the logical address generation ends in one machine cycle.

Only when the decision unit 27 produce a result signal to indicate in few cases that addition is necessary, is the lower sum stored, at a seventh step S7, in the logical address register 12 as the lower address part LA. One more machine cycle is necessary than as a second machine cycle in generating the logical address. The logical address generating device therefore specifies at an eighth step S8 continuation of the logical address generation in the known manner.

The machine cycle proceeds to the second machine cycle. The adder 21 now calculates the higher sum at a ninth step S9. The decision unit 27 again checks at a tenth step S10 whether or not a carry of a binary one bit is produced as an overflow when the adder 21 calculates the higher sum. When the overflow is present at the tenth step S10, the logical address generating device carries out overflow processing at an eleventh step S11 in the known manner. When no overflow is detected at the tenth step S10, the output selector 31 is made to select the higher sum by the result signal being indicative of the necessity of addition. The higher sum is stored at a twelfth step S12 in the logical address register 12 through the second output connection 32 as the higher address part HA. For the few cases where the addition is necessary, the logical address generation ends in the second machine cycle, namely, in two machine cycles.

It is now understood that the decision unit 27 comprises a second decision circuit (S5, S6) connected to the flip-flop 24 for checking whether a carry results in addition to the lower sum as binary zero or binary one bit. The second decision circuit thereby produces first and second carry decision signals when the carry in question is a binary zero bit and a binary one bit, respectively. The decision unit 27 further comprises a third decision circuit connected to the first and the second decision circuits in the manner symbolized by four vertical lines 36 through 39. The third decision circuit is for deciding that the addition is unnecessary either when the first part decision and the first carry decision signals are produced or when the second part decision and the second carry decision signals are produced. The third decision circuit otherwise decides that the addition is necessary.

While this invention has thus far been described in specific conjunction with a single embodiment thereof, it will now be readily possible for one skilled in the art to make the first through the third decision circuits and consequently the decision unit 27. Furthermore, it will be readily possible for one skilled in the art to carry this invention into effect in various other ways. Examples are as follows. Depending on the circumstances, the first higher half 1H may more likely consist of either binary zero or binary one bits than the second higher half 2H. In this event, it is preferred that the base and the index registers 13 and 14 should specify the second and the first words, respectively. Each of the first and the second words may not be divided into the higher and the lower halves but into a higher and a lower part of different word lengths provided that the lower part is the predetermined word length long. It is possible to use a combination of a simple connection and a one-bit memory in the carry holding unit instead of the flip-flop 24 alone. In this event, the simple connection is used in "holding" the carry for the decision as to the lack of necessity or for the addition. The one-bit memory is connected to the simple connection and used in holding the carry for use when the addition is necessary.

What is claimed is:

1. An address generating device for use in a digital data processing system generating a logical address from an instruction code supplied thereto and specifying first, second, and third elements,
    each of said first and said second elements being of a double word length,
    said third element being of a predetermined bit length shorter than a single word length,
    said logical address being of a double word length,
    said device comprising:
        first selecting means for selecting one of a higher half or a lower half of said first element;
        second selecting means for selecting one of a higher half or a lower half of said second element;
        an adder of a single word length, connected to said first and said second selecting means and supplied with said third element
            for adding said third element and said lower half of each of said first and said second elements to calculate a lower carry signal and to calculate a lower sum of a single word length in a first address-calculating mode, or
            for adding said lower carry signal and said higher half of each of said first and said second elements to calculate a higher carry signal and to calculate a higher sum of a single word length in a second address-calculating mode;
        holding means connected to said adder for holding said lower carry signal;

decision means, supplied with said lower carry signal and said higher half of said second element, for deciding whether it is necessary to set said second address-calculating mode for adding said higher half of each of said first and said second elements and said lower carry signal from said holding means, third selecting means for selecting said third element or said lower carry signal from said holding means;

fourth selecting means, supplied with said higher sum calculated by said adder and said higher half of said first element, for selecting a higher half of said logical address of a double word length; and a logical address register of a double word length for storing an output of said fourth selecting means as a higher half and said lower sum calculated by said adder in said first address-calculating mode as a lower half and for concatenating a higher half and a lower half of said logical address.

2. A device as claimed in claim 1, wherein:

said decision means decides that it is unnecessary to set said second address-calculating mode for adding either when said lower carry signal delivered by said adder is a binary zero bit and said higher half of said second element consists of binary zero bits in said first address-calculating mode or when said lower carry signal delivered by said adder is a binary one bit and said higher half of said second element consists of binary one bits in said first address-calculating mode, and said decision means otherwise deciding that said second address-calculating mode is necessary.

3. A device as claimed in claim 2, wherein:

said decision means generates a first selection signal for causing said first and said second selecting means to select to deliver respectively said lower half of each of said first and second elements to said adder and said third selecting means to select to deliver said third element to said adder in said first address-calculation mode, or for causing said first and said second selecting means to select to deliver said higher half of each of said first and said second elements to said adder and said third selecting means to select to deliver said lower carry signal from said holding means to said adder in said second address-calculating mode.

4. A device as claimed in claim 3, wherein:

said decision means generates a second selection signal for, when it is unnecessary to set said second address-calculating mode for adding, causing said fourth selecting means to select said higher half of said first element in said first address-calculating mode, and for, when it is necessary to set said second address-calculating mode for adding, causing said fourth selecting means to select said higher sum calculated by said adder in said second address-calculating mode to deliver said higher half of said logical address.

* * * * *